(12) United States Patent  
Liao (10) Patent No.: US 7,599,129 B2
(45) Date of Patent: *Oct. 6, 2009

(54) COMPACT IMAGING LENS SYSTEM (75) Inventor: Chen-Cheng Liao, Taipei (TW)

(73) Assignee: Asia Optical Co., Inc, Taichung (TW)

( * ) Notice: Subject to any disclaimer, the term of this patent is extended or adjusted under 35 U.S.C. 154(b) by 47 days.

This patent is subject to a terminal disclaimer.

(21) Appl. No.: 11/851,526

(22) Filed: Sep. 7, 2007

(65) Prior Publication Data

US 2008/0062537 A1 Mar. 13, 2008

(30) Foreign Application Priority Data

Sep. 8, 2006 (TW) ............... 95133356 A (51) Int. Cl.
G02B 13/04 (2006.01)
G02B 17/00 (2006.01)
(52) U.S. Cl. ........................ 359/753; 359/735
(58) Field of Classification Search ........... 359/631, 359/678, 716, 720, 735, 753
See application file for complete search history.

(56) References Cited

U.S. PATENT DOCUMENTS

| 4,493,537 | A | 1/1985 | Nakahashi | |
|---|---|---|---|---|
| 4,525,038 | A | 6/1985 | Muller | |
| 5,251,073 | A | 10/1993 | Schauss | |
| 6,323,892 | B1 | 11/2001 | Mihara | |
| 6,788,343 | B1 | 9/2004 | Takayoshi | |
| 7,508,597 | B2 * | 3/2009 | Liao | 359/726 |
| 2002/0041445 | A1 * | 4/2002 | Nishioka et al. | 359/627 |
| 2004/0027475 | A1 * | 2/2004 | Kamo | 348/335 |
| 2008/0062538 | A1 * | 3/2008 | Liao | 359/720 |

* cited by examiner

Primary Examiner—David N Spector (57) ABSTRACT

A compact imaging lens system includes, in order from the object side to the image side, a first lens (1) of negative refractive power, a free-form surface prism (2) of positive refractive power and a second lens (3) of positive refractive power. The free-form surface prism has an incidence surface (S3), a reflection surface (S4) and an exit surface (S5). The first lens is disposed on the side of the incidence surface, and the second lens is disposed on the side of the exit surface. The free-form surface prism functions equivalent to a right-angle prism with aspheric surfaces.

17 Claims, 13 Drawing Sheets

Longitudinal Spherical Aberration

FIG. 3

Field Sags

COMPACT IMAGING LENS SYSTEM

BACKGROUND OF THE INVENTION

1. Field of the Invention

The present invention relates to an imaging lens system, and particularly relates to a compact imaging lens system suitable for use in an image pick-up device.

2. Description of Prior Art

Integration of photoelectric technology into an image pick-up device is now a trend in current technology development. To fulfill the portability requirement, the image pick-up device has to be light in weight and small in size. In the selection of imaging lens shapes and materials for use in the image pick-up device, the conventional spherical ground glass lenses have been widely adopted because there is a wide range of materials available for making such lenses and color aberration can be more easily corrected. However, the spherical ground glass lenses have the disadvantages of uneasy correction of spherical aberration and astigmatic aberration in the case of a small F-number and a large wide angle of field. To improve the above-mentioned drawbacks existed in the conventional spherical ground glass lenses, aspheric glass or plastic lenses have been introduced to help reduce these aberrations. The inclusion of aspheric lens elements in a lens system significantly increases image quality and reduces barrel distortion associated with wide-angle lenses. Further, since one aspheric lens element can replace several spherical lens elements in the lens system to perform the same aberration correction function, reduction of the amount of lens elements in the system is also enabled, which makes the lens system smaller and lighter. However, for a conventional glass lens system, to effectively correct off-axis aberrations and color aberrations associated with a wide angle of view, a relatively larger amount of lens elements must be employed. This makes such a glass lens system long in length, large in volume and high in cost, which deviates from the current compact trend. In addition, the machining of an aspheric glass lens element is very difficult, which further limits the application of such a glass lens system in a compact digital product. Comparatively, an aspheric plastic lens element is easy to machine and low in cost. Therefore, aspheric plastic lens elements are widely used in compact imaging lens systems to reduce the length of the entire system.

For a wide-angle lens system, important design considerations include correction of off-axis aberrations and color aberrations associated with a wide angle of view, serious distortions and so on. Accordingly, a wide-angle lens system design is more difficult, and various problems may arise such as unmachinability of a lens element shape and too large chief ray angles. Various wide-angle lens system designs have been disclosed in, for example, U.S. Pat. Nos. 4,493,537, 5,251,073, and 4,525,038. However, a design, which ensures effective correction of various aberrations at a very short total length while giving attention to actual machinability, is rare. Accordingly, a prism type design and a free-form surface prism type design have been proposed to reduce the total length of the lens system. The term "free-form surface" means a curved surface that is neither a plane nor part of a sphere, and the term "free-form surface prism" means a prism having a free-form surface on at least one surface. A free-form surface prism is described in, for example, U.S. Pat. No. 6,323,892. The above-mentioned prism type design folds the optical path by 90 degrees by means of a 45° reflecting mirror that has no aberration correction function.

The application of a free-form surface prism has the following advantages: (1) The total length of a lens system can be reduced by several light reflections in the free-form surface prism to obtain the light path folding effect; (2) As no chromatic aberration exists on a reflection surface of the free-form surface prism, the amount of constituting elements in the lens system can be reduced since no additional lens elements are needed to compensate a large amount of chromatic aberrations which occur when employing conventional refraction elements; (3) Assembly of the lens system is facilitated since the positional relationship between optical surfaces on the free-form surface prism are fixed. However, conventional free-form surface prisms are generally complicate in construction, which makes its design, machining and fixing difficult. Therefore, there still remains room for improvement.

SUMMARY OF THE INVENTION

Accordingly, the main object of the present invention is to provide a compact imaging lens system that employs a free-form surface prism to reduce the total length of the lens system by light reflection.

Another object of the present invention is to provide a compact imaging lens system that is simple in structure, easy in machining, low in cost, and has a wide angle of view and good image quality.

To achieve the above objects of the present invention, a compact imaging lens system in accordance with the present invention, which is suitable for use in an image pick-up device, includes, in order from an object side to an image side, a first lens of negative refractive power, a prism of positive refractive power and a second lens of positive refractive power. The prism has an incidence surface, a reflection surface and an exit surface. The first lens is disposed on the side of the incidence surface of the prism, and the second lens is disposed on the side of the exit surface of the prism. The first lens is a biconcave lens having a first concave surface facing the object to be imaged and a second concave surface on the image side. The prism is in the form of a free-form surface prism that functions equivalent to a right-angle prism with aspheric surfaces. The incidence surface of the prism faces the second surface of the first lens, the reflection surface of the prism is inclinedly disposed on an optical axis of the lens system, and the exit surface of the prism faces toward an image plane. Both the incidence surface and the exit surface of the prism are convex surfaces, and the reflection surface of the prism is a planar surface or a curved surface. The second lens is disposed between the free-form surface prism and the image plane, and is in the form of a biconvex lens, a concave-convex or a convex-concave lens. An aperture stop is further disposed between the second lens and the free-form surface prism.

At least one of the first and second surfaces of the first lens is made aspheric. Both the incidence surface and the exit surface of the prism are aspheric surfaces. The second lens may also be an aspheric lens.

The first lens, the prism and the second lens are all made of plastics. Alternatively, the second lens also may be made of glass.

The first lens, the prism and the second lens of the present compact imaging lens system satisfy the following conditional expressions:

$$1.3 < |f1/f| < 2.3;$$

$$2.5 < f2/f < 5.0;$$

$$2.5 < f3/f < 4.0$$

where f represents effective focal length of the entire lens system, and f1, f2 and f3 represent focal lengths of the first lens, the prism and the second lens, respectively.

Compared with the prior art, the present compact imaging lens system is only composed of two lenses and a prism, and thus has the advantages of simple structure, easy assembly, wide angle of view, small size and light weight. By application of a free-form surface prism, the optical axis of the present lens system is rotated by 90 degrees to fold the optical path, whereby the total length and the volume of the present lens system can be reduced. At the same time, various aberrations also can be compensated to obtain high image resolution. Further, by replacing conventional glass lens elements with injection molded plastic lens elements having aspheric surfaces, the production cost of the present lens system is significantly reduced, the optical length of the present lens system is shortened and the production yield is also increased.

BRIEF DESCRIPTION OF THE DRAWINGS

The present invention may best be understood through the following description with reference to the accompanying drawings, in which.

DETAILED DESCRIPTION OF THE PREFERRED EMBODIMENTS

The compact imaging lens system in accordance with the present invention is suitable for use in an image pick-up device, so that an object to be imaged can be imaged onto an image sensor such as a CCD (Charge-Coupled Device) sensor or CMOS (Complimentary Metal-Oxide Semiconductor) sensor.

Figure 1:
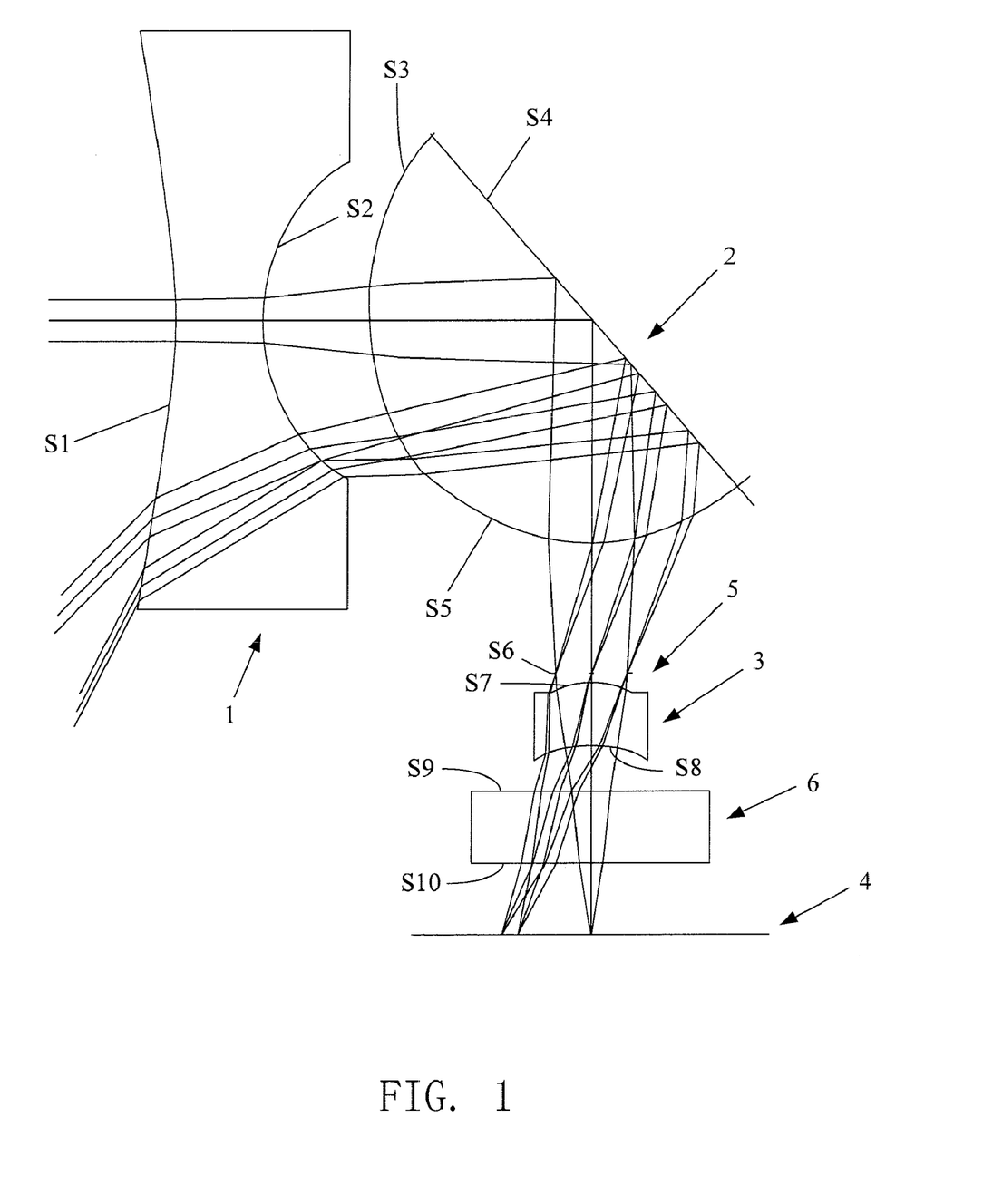
FIG. 1 is an optical cross-sectional view of a compact imaging lens system in accordance with the concept of the present invention.

Referring to FIG. 1, a compact imaging lens system in accordance with the concept of the present invention includes, in order from the object side to the image side, a first lens 1 of negative refractive power, a prism 2 of positive refractive power and a second lens 3 of positive refractive power. The prism 2 and the first lens 1 are arranged in a juxtaposed manner. The second lens 3 is disposed below the prism 2 and adjacent to the image side. The incident light from the object to be imaged is transmitted sequentially through the first lens 1, the prism 2 and the second lens 3, and then is focused onto an image sensor (image plane) 4 such as a CCD sensor or CMOS sensor to obtain a clear image.

The first lens 1 is a biconcave lens for collecting light from the object to be imaged. The first lens 1 has a first concave surface S1 facing the object and a second concave surface S2 facing the prism 2. At least one of the first and second concave surfaces S1 and S2 is made aspheric for compensating distortion and lateral color aberrations.

The prism 2 is in the form of a free-form surface prism that functions equivalent to a right-angle prism with aspheric surfaces. It should be understood that, while the intersect angle arrangement of the prism 2 is described as a right angle and the right angle is preferred for improving machining stability and tolerance allowance, in some embodiments other intersect angles may also be employed. The prism 2 simultaneously implements several optical functions that include providing three surfaces for aberration correction and rotating the optical axis of the lens system by 90 degrees. The prism 2 has an incidence surface S3 facing the second concave surface S2 of the first lens 1, a reflection surface S4 inclinedly disposed on the optical axis, and an exit surface S5 toward the image plane 4. Both the incidence surface S3 and the exit surface S5 are convex surfaces and are made aspheric, and the reflection surface S4 is a planar surface or a curved surface. The first lens 1 is disposed on the side of the incidence surface S3 of the prism 2, and the second lens 3 is disposed on the side of the exit surface S5 of the prism 2.

The second lens 3 having two opposite surfaces S7, S8 is disposed between the free-form surface prism 2 and the image plane 4, and is in the form of a biconvex lens, a concave-convex or a convex-concave lens. The second lens 3 serves to compensate spherical aberrations and on-axis color aberrations. The second lens 3 may be a spherical convex lens or an aspheric convex lens having at least one aspheric surface, the latter of which is preferred for aberration collection purposes.

An aperture stop 5 is further disposed between the second lens 3 and the free-form surface prism 2 for controlling the amount of light that enters. The present lens system may further include a glass cover 6 between the aperture stop 5 and the image plane 4. Optical functional films, such as an anti-reflection film and an IR (infrared) reflecting film, may be coated on the glass cover 6 to obtain a better image quality.

As described above, the first lens 1, the free-form surface prism 2 and the second lens 3 of the present imaging lens system may all be made aspheric. Thus, while ensuring efficient correction of color aberrations and off-axis aberrations, the number of constituting elements of the present lens system can be significantly reduced, the total length of the present lens system thus can be shortened and the system weight also can be significantly reduced. To reduce production costs, the first lens 1, the prism 2 and the second lens 3 are preferably all made of plastics. Alternatively, the second lens 3 may be made of glass.

In the present compact imaging lens system, the light from the object to be imaged is first transmitted through the first lens 1, incident into the prism 2 via the incidence surface S3 of the prism 2, then reflected by the reflection surface S4 to the exit surface S5 of the prism 2, and finally incident into the second lens 3 through the exit surface S5 of the prism 2 and the aperture stop 5. The interior light reflection within the prism 2 by the reflection surface S4 rotates the optical axis of the present lens system by 90 degrees to achieve the optical path folding effect. Accordingly, in comparison with a conventional refraction optical system, the size of the present optical system can be significantly reduced. Further, the three surfaces of the free-form surface prism 2, i.e., the incidence refracting surface S3, the reflection surface S4 and the exit refracting surface S5, perform refracting, reflecting and aberration collecting functions equivalent to three individual lenses. Therefore, in comparison with a reflecting member only having a reflecting function for optical path folding, the free-form surface prism 2 has multiple functions one of which is aberration correction. In addition, compared with a conventional design having corresponding lenses or reflectors disposed in the air, since the prism 2 body is constructed with a transparent material having a higher refractive index than the air, the optical path length of the present lens system employing the prism 2 can be elongated while shortening the total length thereof.

To assure good optical performance, the first lens 1, the prism 2 and the second lens 3 of the present compact imaging lens system satisfy the following conditional expressions:

$$1.3 < |f1/f| < 2.3 \quad (1)$$

where f represents the effective focal length of the entire lens system and f1 represents the effective focal length of the first lens 1 and when |f1/f| exceeds the upper limit, astigmatism correction becomes insufficient, and when it is below the lower limit, axial color aberrations increase;

$$2.5 < f2/f < 5.0 \quad (2)$$

where f2 represents the effective focal length of the prism 2 and when f2/f exceeds the upper limit lateral color aberrations increase, and when it is below the lower limit, spherical aberrations and coma aberrations are difficult to correct;

$$2.5 < f3/f < 4.0 \quad (3)$$

where f3 represents the effective focal length of the second lens 3 and when f3/f exceeds the upper limit, that is, when the focal length of the second lens 3 is too long, the total length of the present lens system becomes increasingly long, and when it is below the lower limit, coma aberrations and astigmatism aberrations are difficult to correct.

The present invention will be more fully understood by describing four numerical embodiments as follows in combination with corresponding figures and graphs.

Numerical Embodiment 1

Figure 2:
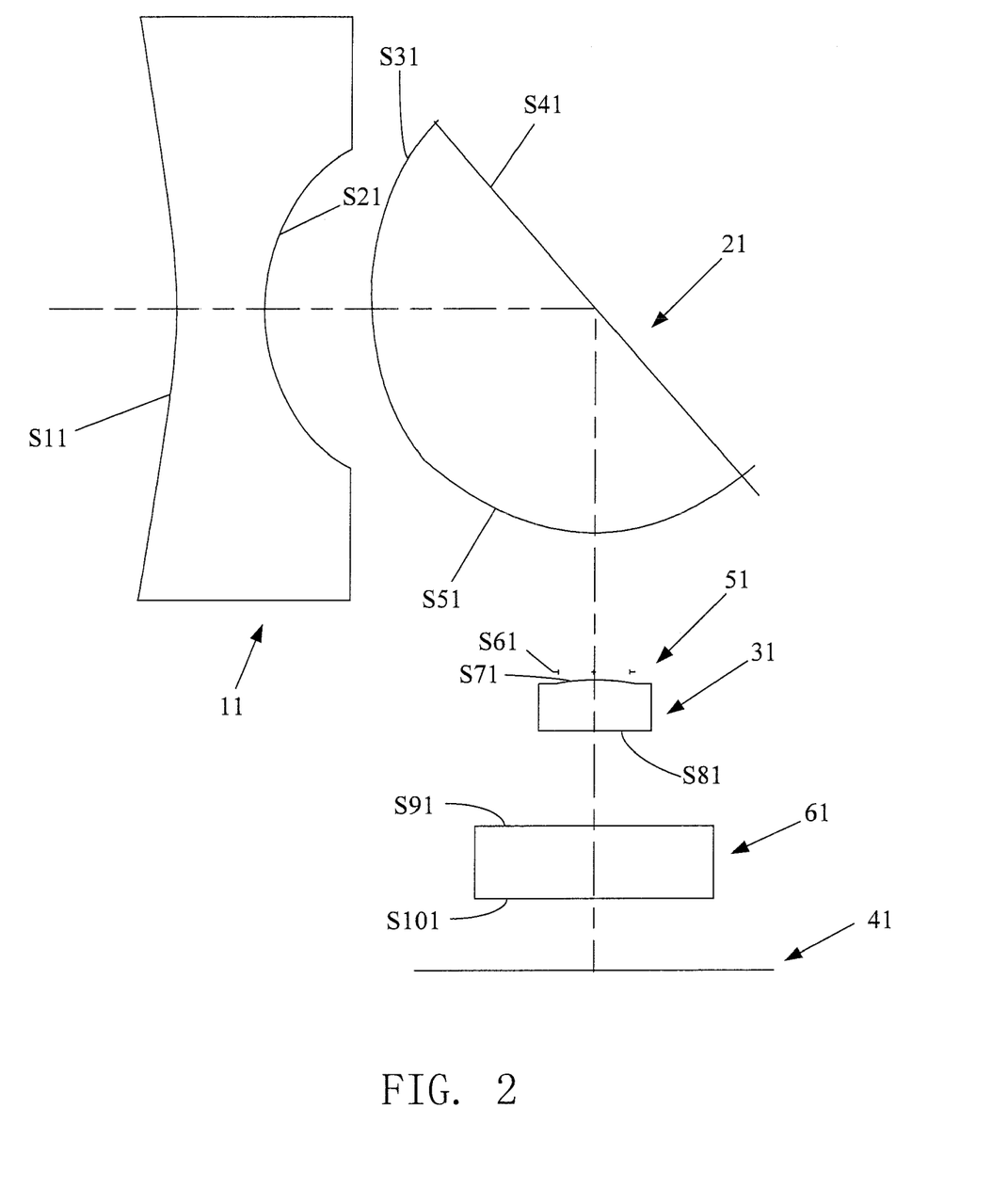
FIG. 2 is an optical cross-sectional view of a compact imaging lens system in accordance with Numerical Embodiment 1 of the present invention.
Figure 3:
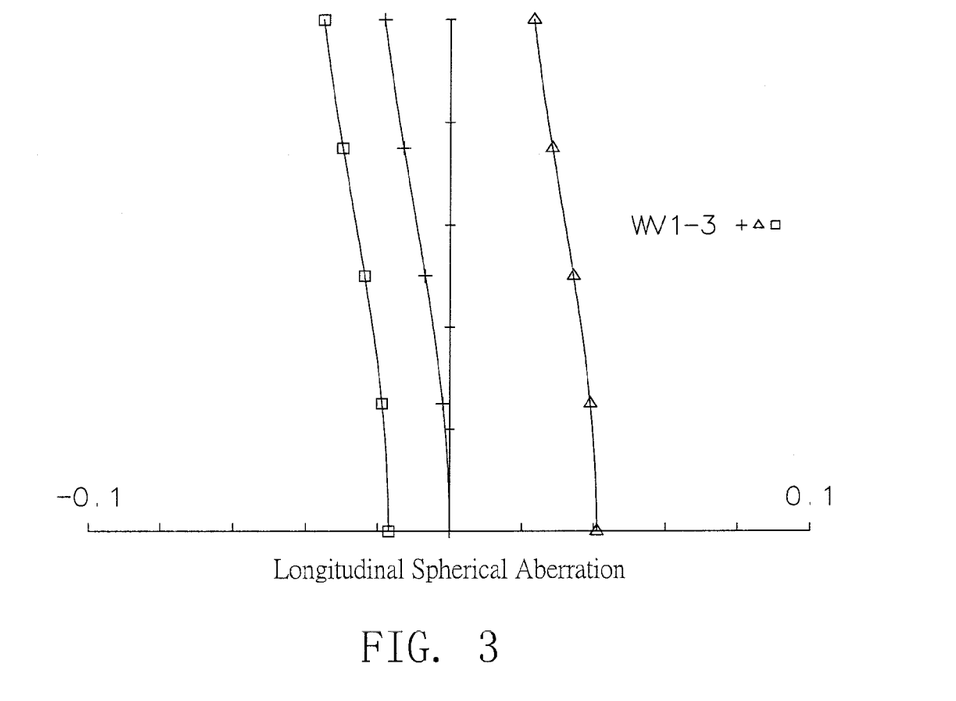
FIGS. 3-6 respectively show graphs of longitudinal spherical aberration, field sags, distortion and lateral color aberration of Numerical Embodiment 1 of the present invention.
Figure 4:
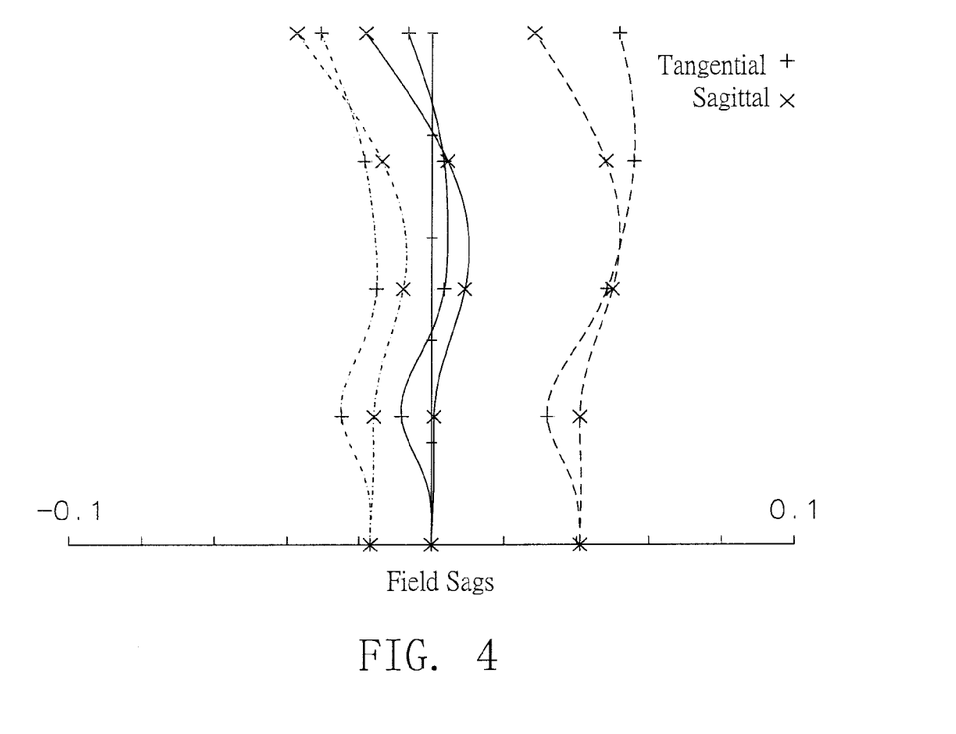
Figure 5:
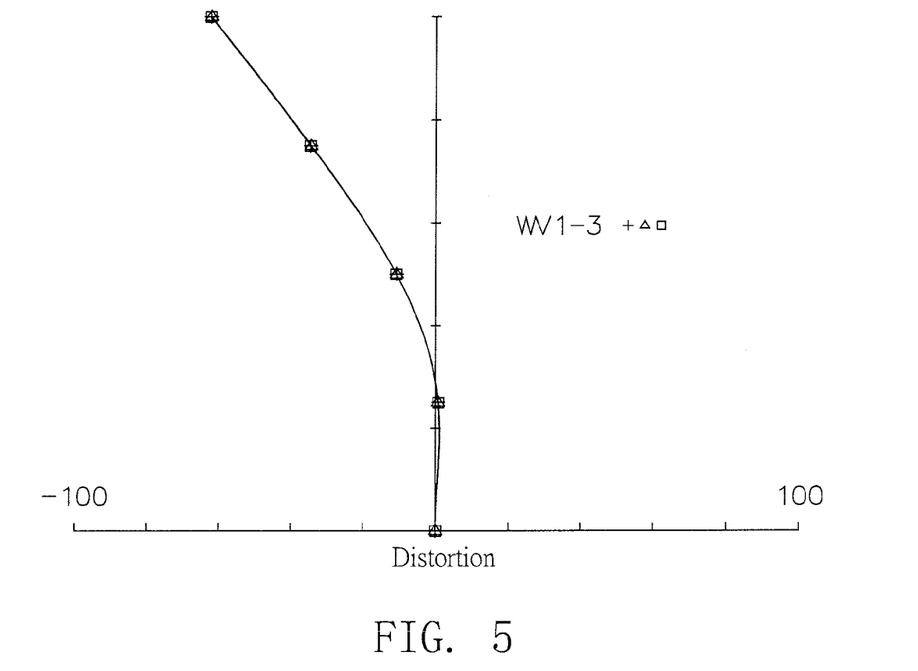
Figure 6:
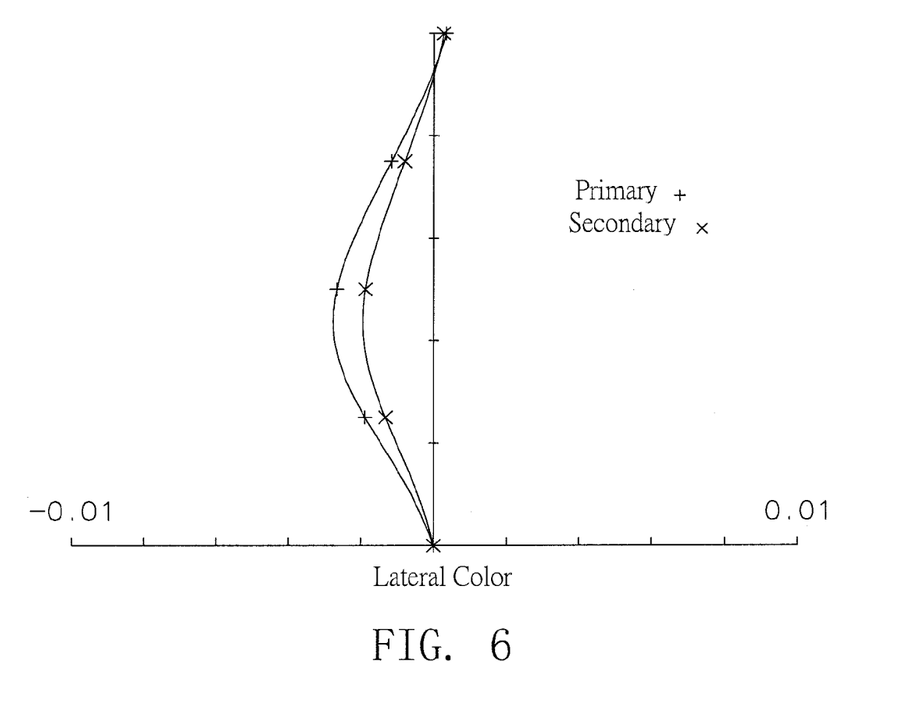

As shown in FIG. 2, a compact imaging lens system in accordance with Numerical Embodiment 1 of the present invention includes a first lens 11 of negative refractive power, a free-form surface prism 21 of positive refractive power, an aperture stop 51, a second lens 31 of positive refractive power, a glass cover 61 and an image plane 41. The first lens 11 is a biconcave lens. The free-form surface prism 21 has a convex incidence surface S31, a planar reflecting surface S41 and a convex exit surface S51. The second lens 31 is a biconvex lens.

The numerical data of Numerical Embodiment 1 will be shown below. In each numerical embodiment, "i" indicates the order of the surface from the object side (including lens surfaces, the aperture stop, the glass cover and the image plane), Ri indicates the curvature radius of the ith surface, D/T indicates the ith member thickness or the distance between the ith surface and the (i+1)th surface, and Nd and Vd indicate the refractive index and Abbe number of the ith member, respectively, for d-line.

| Surface (i) | Ri (mm) | D/T (mm) | Nd | Vd |
|---|---|---|---|---|
| S0 | ∞ | | | |
| S11 | −3.740 | 1.1 | 1.5136 | 57.4 |
| S21 | 1.90 | 1.70 | | |
| S31 | 4.048 | 2.726 | 1.5136 | 57.4 |
| S41 | ∞ | −2.726 | 1.5136 | 57.4 |
| S51 | 2.692 | −1.5 | | |
| S61 | ∞ | −0.1 | | |
| S71 | −2.491 | −0.7 | 1.536 | 57.4 |
| S81 | 18.681 | −1.77 | | |
| S91 | ∞ | −0.8 | 1.51633 | 64.1 |
| S101 | ∞ | | | |

In the above table, as the coordinate rotates 90 degrees at the reflecting surface S41 of the prism 21, negative distances are shown.

In this numerical embodiment, the first lens 11, the prism 21 and the second lens 31 are all made aspheric. The aspheric surfaces thereof are expressed by the following equation:

$$z = \frac{ch^2}{1 + [1 - (k+1)c^2h^2]^{\frac{1}{2}}} + Ah^4 + Bh^6 + Ch^8 + Dh^{10}$$

where z is sag value along the optical axis; c is the base curvature (1/radius) of the surface; h is the semi-diameter height; k is the conic coefficient; and A, B, C and D are the 4th-order, 6th-order, 8th-order and 10th-order aspheric coefficients, respectively.

Specifically, the two surfaces S11, S21 of the first lens 11, the incidence surface S31 and the exit surface S51 of the prism 21, and the surface S71 of the second lens 31 are all made aspheric. Aspheric coefficients for these aspheric surfaces are illustrated below:

| Surface (i) | Coef. | | | |
|---|---|---|---|---|
| | A | B | C | D |
| S11 | −28.486363 | 0 | 0 | 0 |
| S21 | 0 | −0.012845 | 0.001263 | 0 |
| S31 | −22.549277 | 0 | 0 | 0 |
| S51 | −1.208421 | 0 | 0 | 0 |
| S71 | 0.424287 | 0 | 0 | 0 |

In this numerical embodiment, the respective values of the above conditions (1), (2) and (3), and the effective focal length, the field of view, the total length and the F-number of the present lens system are listed in the table as below.

| | |
|---|---|
| Effective Focal Length of Lens System (f) | 1.3 mm |
| Field of View (F.O.V) | 120 degrees |
| Total Length of Lens System | 13.13 mm |
| F-number | 2.82 |
| \|f1/f\| | 1.77 |
| f2/f | 3.34 |
| f3/f | 3.33 |

As illustrated in the above table, the respective values of |f1/f|, f2/f and f3/f are 1.77, 3.34 and 3.33, which are all within a corresponding range specified by condition (1), (2) or (3).

FIGS. 3-6 respectively show graphs of longitudinal spherical aberration, field sags, distortion and lateral color aberration of Numerical Embodiment 1 of the present compact imaging lens system. From these graphs, it can be seen that the present compact imaging lens system of Numerical Embodiment 1 provides a high level of optical performance.

Numerical Embodiment 2

Figure 7:
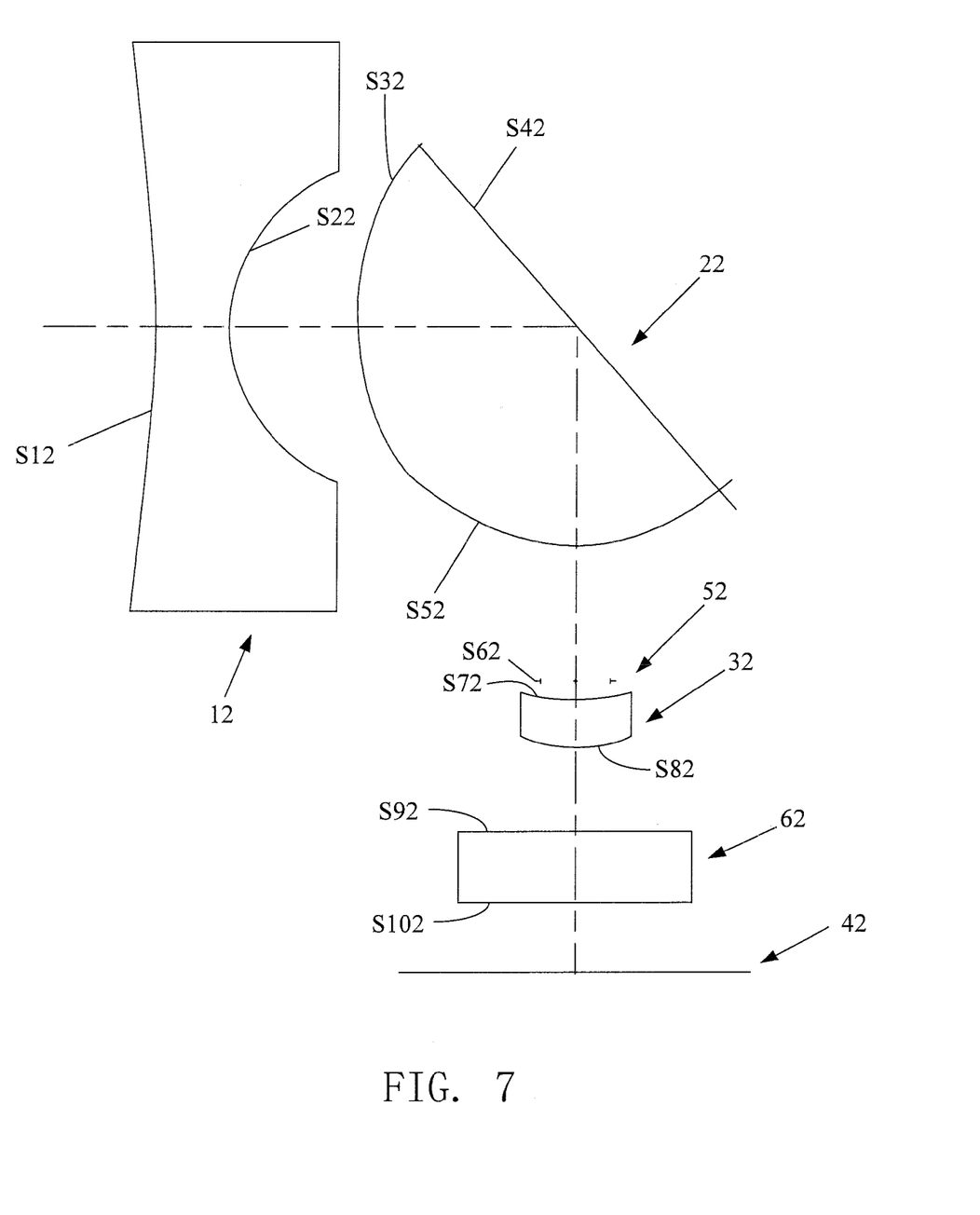
FIG. 7 is an optical cross-sectional view of a compact imaging lens system in accordance with Numerical Embodiment 2 of the present invention.
Figure 8:
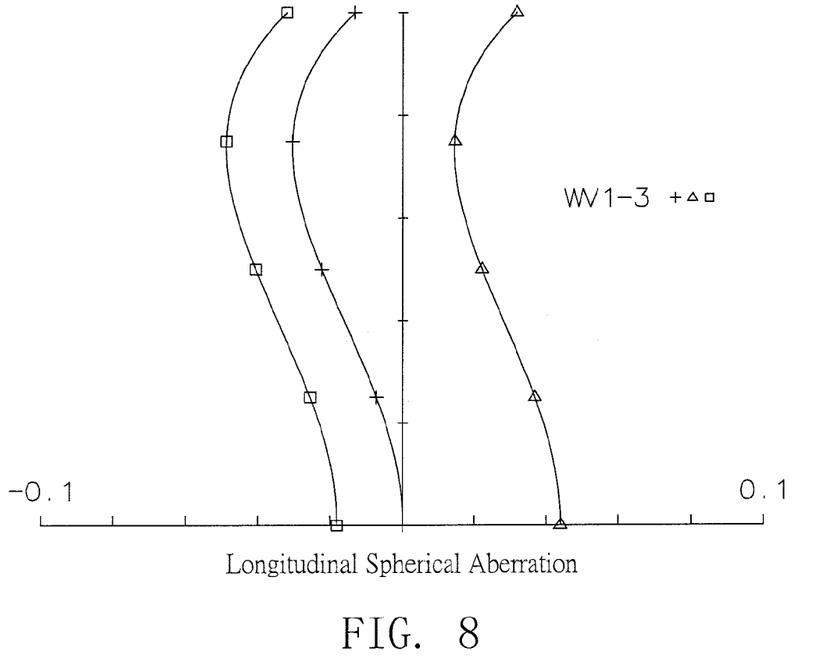
FIGS. 8-11 respectively show graphs of longitudinal spherical aberration, field sags, distortion and lateral color aberration of Numerical Embodiment 2 of the present invention.
Figure 9:
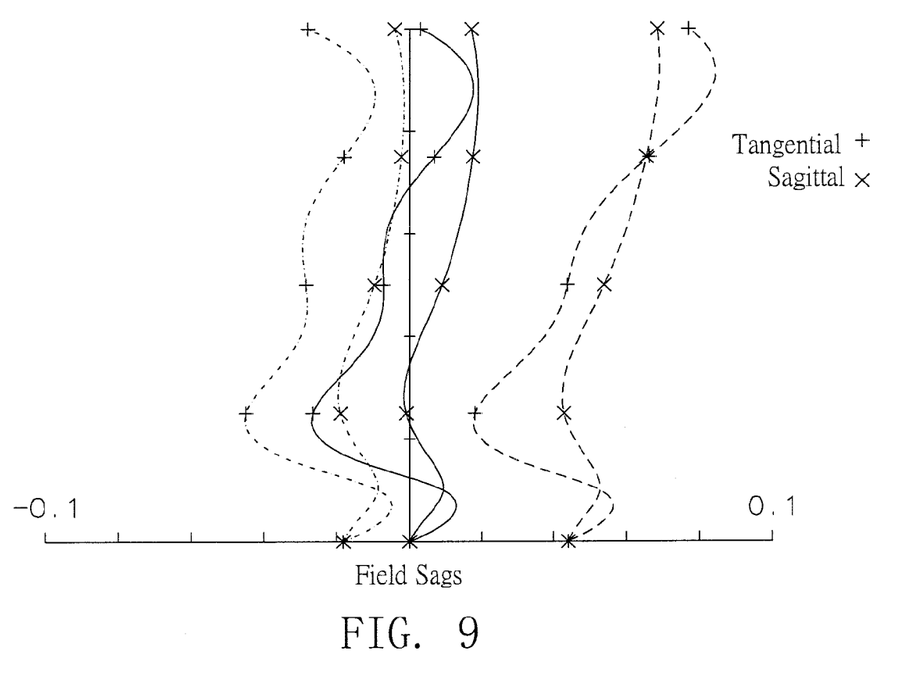
Figure 10:
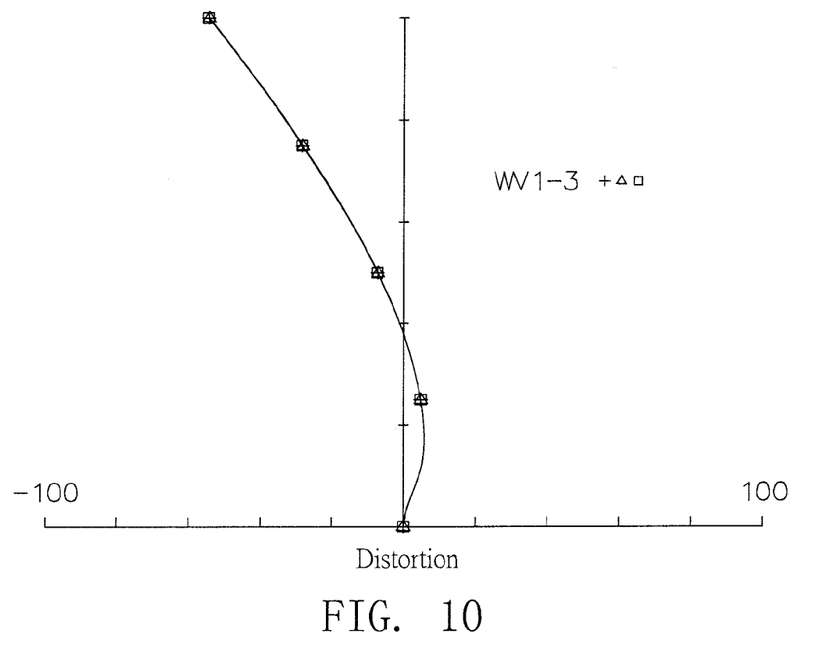
Figure 11:
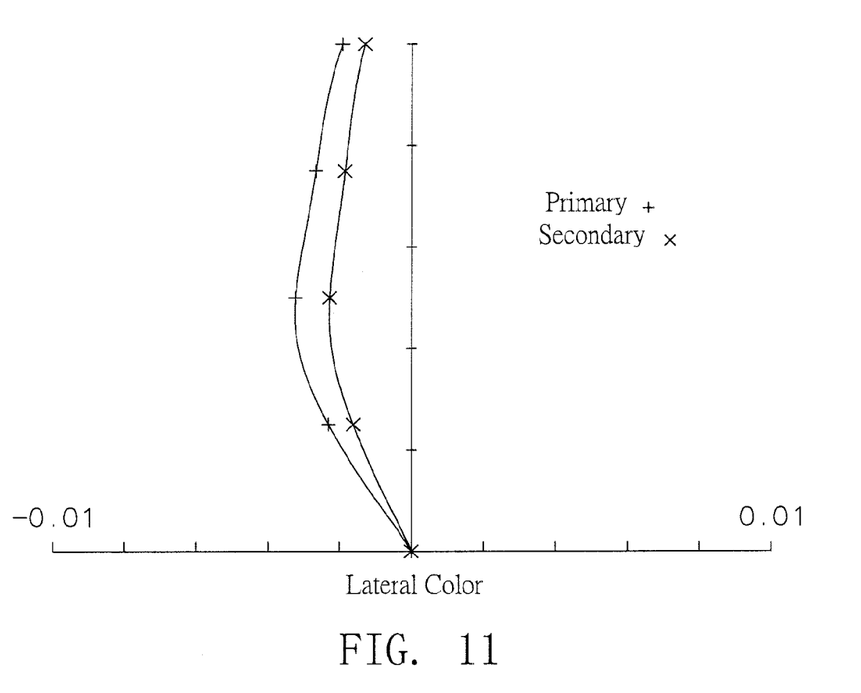

As shown in FIG. 7, a compact imaging lens system in accordance with Numerical Embodiment 2 of the present invention includes a first lens 12 of negative refractive power, a free-form surface prism 22 of positive refractive power, an aperture stop 52, a second lens 32 of positive refractive power, a glass cover 62 and an image plane 42. The first lens 12 is a biconcave lens. The free-form surface prism 22 has a convex incidence surface S32, a planar reflecting surface S42 and a convex exit surface S52. The second lens 32 is a concave-convex lens. The numerical data of Numerical Embodiment 2 will be shown below.

| Surface (i) | Ri (mm) | D/T (mm) | Nd | Vd |
| --- | --- | --- | --- | --- |
| S0 | ∞ | | | |
| S12 | −6.0 | 1.05 | 1.5136 | 57.4 |
| S22 | 2.04 | 1.80 | | |
| S32 | 9.184 | 2.843 | 1.5136 | 57.4 |
| S42 | ∞ | −3.0 | 1.5136 | 57.4 |
| S52 | 2.216 | −1.5 | | |
| S62 | ∞ | −0.206 | | |
| S72 | 5.204 | −0.7 | 1.536 | 57.4 |
| S82 | 1.732 | −2.12 | | |
| S92 | ∞ | −0.8 | 1.51633 | 64.1 |
| S102 | ∞ | | | |

In the above table, as the coordinate rotates 90 degrees at the reflecting surface S42 of the prism 22, negative distances are shown.

In this numerical embodiment, the first lens 12, the prism 22 and the second lens 32 are all made aspheric. The aspheric surfaces thereof are expressed by the following equation:

$$z = \frac{ch^2}{1+[1-(k+1)c^2h^2]^{\frac{1}{2}}} + Ah^4 + Bh^6 + Ch^8 + Dh^{10}$$

And the definition of the variables, z, c, h, k, and A, B, C, and D, are given in the previous Numerical Embodiment 1.

Specifically, the two surfaces S12, S22 of the first lens 12, the incidence surface S32 and the exit surface S52 of the prism 22, and the two surfaces S72, S82 of the second lens 32 are all made aspheric. Aspheric coefficients for these aspheric surfaces are illustrated below:

| | Coef. | | | |
| --- | --- | --- | --- | --- |
| Surface (i) | A | B | C | D |
| S12 | −338.710553 | 0 | 0 | 0 |
| S22 | 0 | −0.000443 | −0.000554 | 0.000554 |
| S32 | −615.010411 | 0 | 0 | 0 |

-continued

| | Coef. | | | |
| --- | --- | --- | --- | --- |
| Surface (i) | A | B | C | D |
| S52 | −1.0 | −0.011221 | 0.001483 | 0 |
| S72 | 0 | 0.043039 | −0.017062 | 0 |
| S82 | 0.302466 | 0 | 0 | 0 |

In this numerical embodiment, the respective values of the above conditions (1), (2) and (3), and the effective focal length, the field of view, the total length and the F-number of the present lens system are listed in the table as below.

| | |
| --- | --- |
| Effective Focal Length of Lens System (f) | 1.33 mm |
| Field of View (F.O.V) | 132 degrees |
| Total Length of Lens System | 14.0 mm |
| F-number | 2.89 |
| |f1/f| | 2.14 |
| f2/f | 3.17 |
| f3/f | 3.56 |

As illustrated in the above table, the respective values of |f1/f|, f2/f and f3/f are 2.14, 3.17 and 3.56, all of which are within a corresponding range specified by condition (1), (2) or (3).

FIGS. 8-11 respectively show graphs of longitudinal spherical aberration, field sags, distortion and lateral color aberration of Numerical Embodiment 2 of the present compact imaging lens system. From these graphs, it can be seen that the present compact imaging lens system of Numerical Embodiment 2 provides a high level of optical performance.

Numerical Embodiment 3

Figure 12:
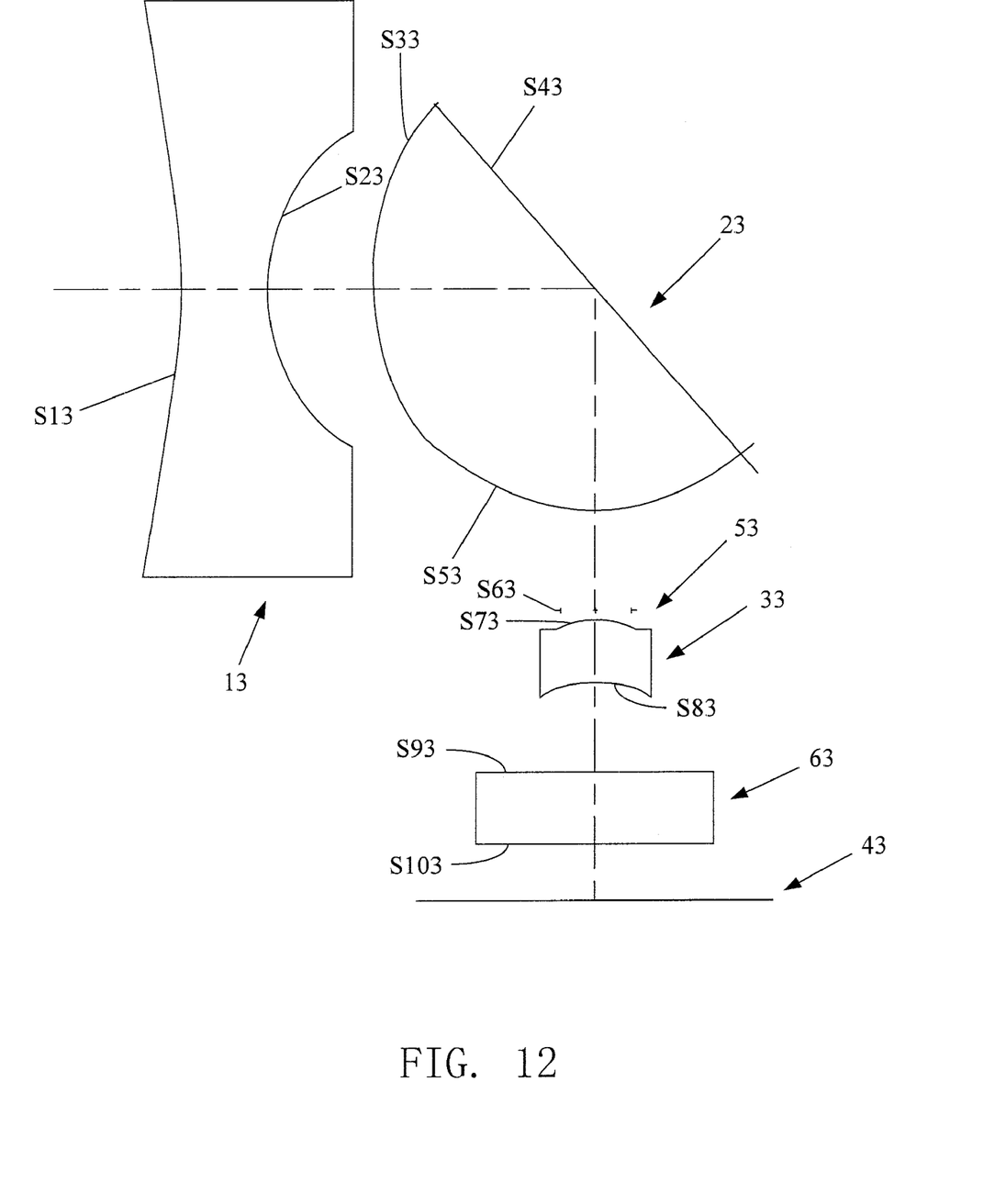
FIG. 12 is an optical cross-sectional view of a compact imaging lens system in accordance with Numerical Embodiment 3 of the present invention.
Figure 13:
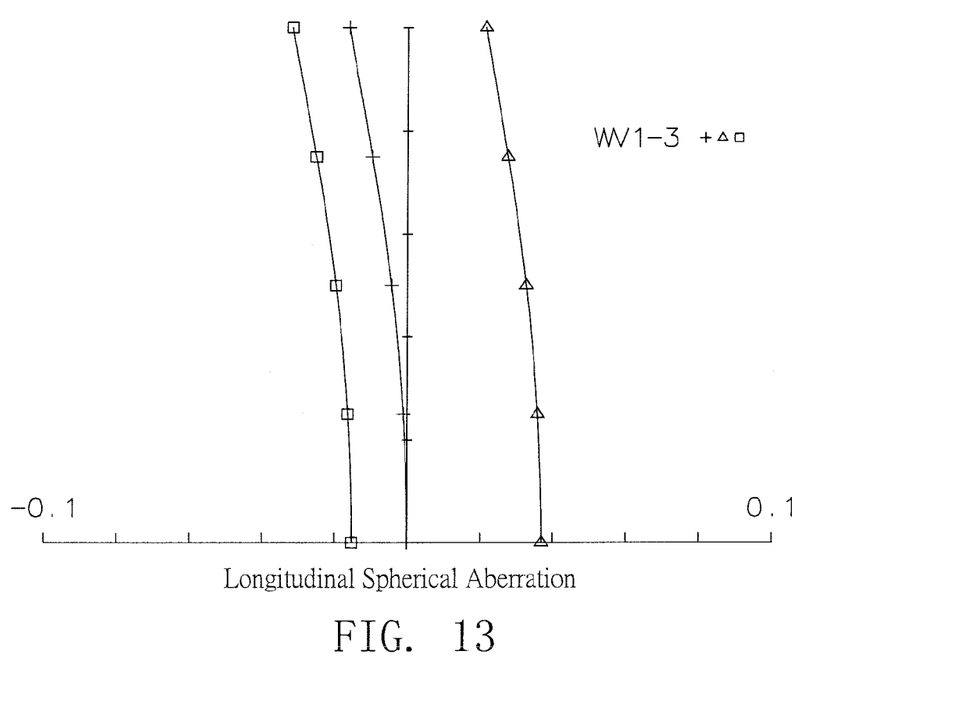
FIGS. 13-16 respectively show graphs of longitudinal spherical aberration, field sags, distortion and lateral color aberration of Numerical Embodiment 3 of the present invention.
Figure 14:
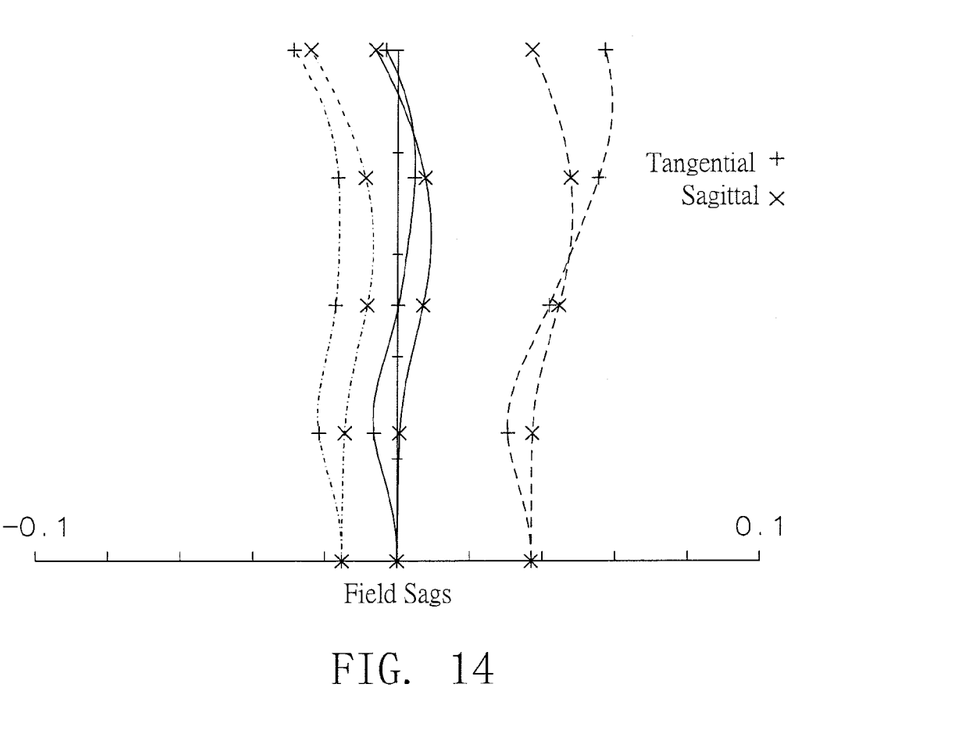
Figure 15:
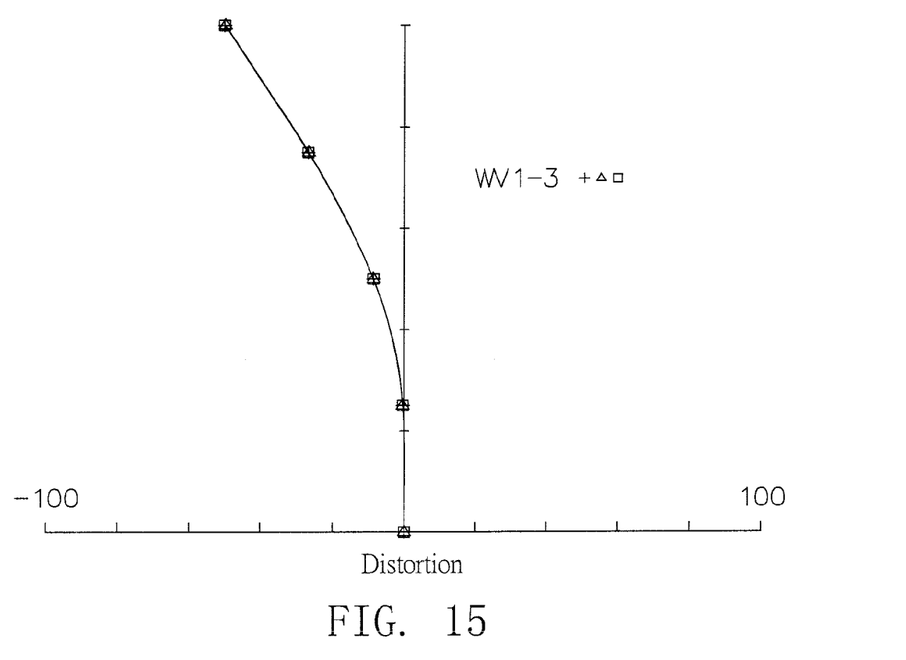
Figure 16:
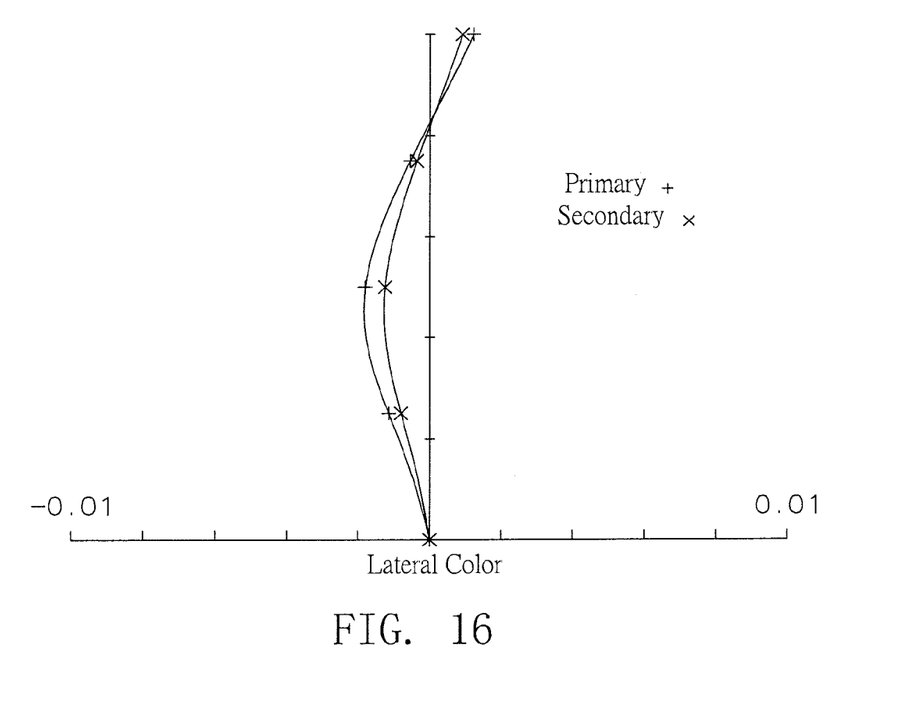

As shown in FIG. 12, a compact imaging lens system in accordance with Numerical Embodiment 3 of the present invention includes a first lens 13 of negative refractive power, a free-form surface prism 23 of positive refractive power, an aperture stop 53, a second lens 33 of positive refractive power, a glass cover 63 and an image plane 43. The first lens 13 is a biconcave lens. The free-form surface prism 23 has a convex incidence surface S33, a planar reflecting surface S43 and a convex exit surface S53. The second lens 33 is a convex-concave lens. The numerical data of Numerical Embodiment 3 will be shown below.

| Surface (i) | Ri (mm) | D/T (mm) | Nd | Vd |
| --- | --- | --- | --- | --- |
| S0 | ∞ | | | |
| S13 | −4.40 | 1.1 | 1.5136 | 57.4 |
| S23 | 1.90 | 1.70 | | |
| S33 | 3.714 | 2.463 | 1.5136 | 57.4 |
| S43 | ∞ | −2.643 | 1.5136 | 57.4 |
| S53 | 2.698 | −1.448 | | |
| S63 | ∞ | −0.1 | | |
| S73 | −1.244 | −0.7 | 1.536 | 57.4 |
| S83 | −2.508 | −1.289 | | |
| S93 | ∞ | −0.8 | 1.51633 | 64.1 |
| S103 | ∞ | | | |

In the above table, as the coordinate rotates 90 degrees at the reflecting surface S43 of the prism 23, negative distances are shown.

In this numerical embodiment, the first lens 13, the prism 23 and the second lens 33 are all made aspheric. The aspheric surfaces thereof are expressed by the following equation:

$$z = \frac{ch^2}{1+[1-(k+1)c^2h^2]^{\frac{1}{2}}} + Ah^4 + Bh^6 + Ch^8 + Dh^{10}$$

And the variables of the equation, including z, c, h, k, and A, B, C and D, are defined previously.

Specifically, the two surfaces S13, S23 of the first lens 13, the incidence surface S33 and the exit surface S53 of the prism 23, and the two surfaces S73, S83 of the second lens 33 are all made aspheric. Aspheric coefficients for these aspheric surfaces are illustrated below:

| | Coef. | | | |
|---|---|---|---|---|
| Surface (i) | A | B | C | D |
| S12 | −28.3223811 | 0 | 0 | 0 |
| S22 | 0 | −0.012719 | 0.001515 | 0 |
| S32 | −13.770545 | 0 | 0 | 0 |
| S52 | −1.035561 | 0 | 0 | 0 |
| S72 | 0.665348 | 0 | 0 | 0 |
| S82 | −0.145209 | −0.196749 | 0 | 0 |

In this numerical embodiment, the respective values of the above conditions (1), (2) and (3), and the effective focal length, the field of view, the total length and the F-number of the present lens system are listed in the table as below.

| | |
|---|---|
| Effective Focal Length of Lens System (f) | 1.3 mm |
| Field of View (F.O.V) | 120 degrees |
| Total Length of Lens System | 12.06 mm |
| F-number | 2.83 |
| \|f1/f\| | 1.88 |
| f2/f | 3.16 |
| f3/f | 3.12 |

As illustrated in the above table, the respective values of |f1/f|, f2/f and f3/f are 1.88, 3.16 and 3.12, all of which are within a corresponding range specified by condition (1), (2) or (3).

FIGS. 13-16 respectively show graphs of longitudinal spherical aberration, field sags, distortion and lateral color aberration of Numerical Embodiment 3 of the present compact imaging lens system. From these graphs, it can be seen that the present compact imaging lens system of Numerical Embodiment 3 provides a high level of optical performance.

Numerical Embodiment 4

Figure 17:
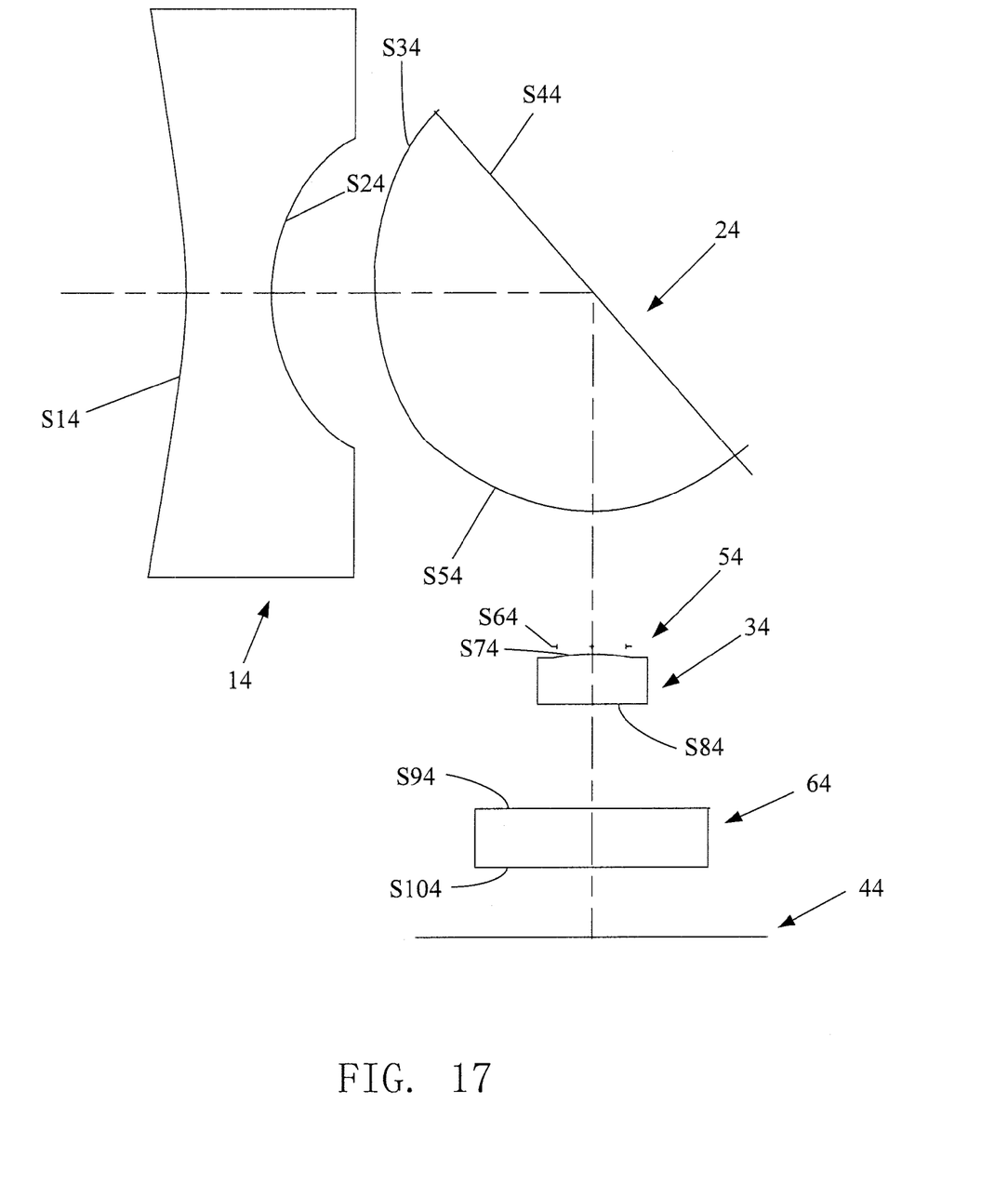
FIG. 17 is an optical cross-sectional view of a compact imaging lens system in accordance with Numerical Embodiment 4 of the present invention.
Figure 18:
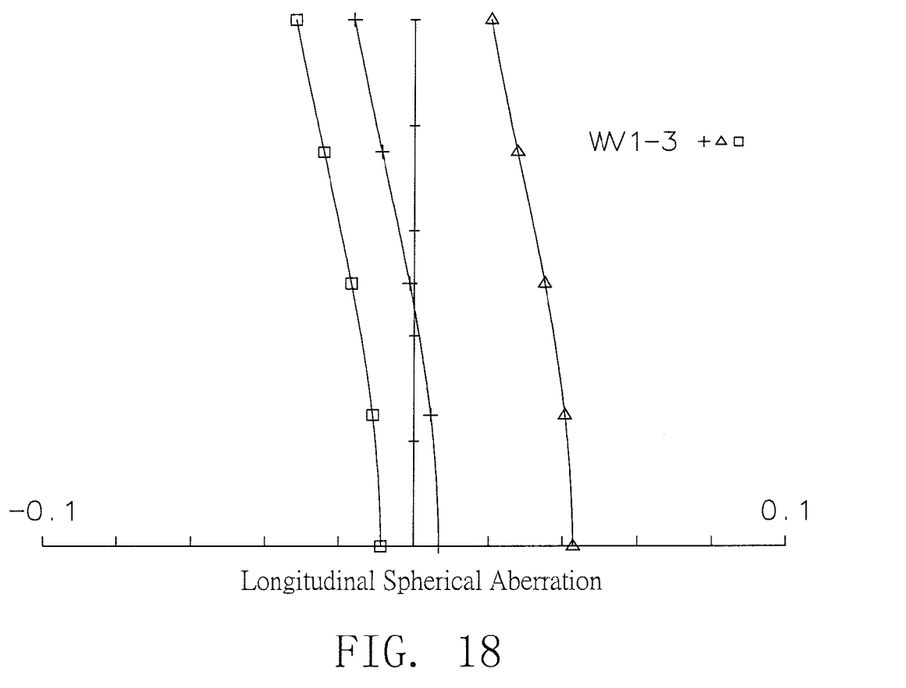
FIGS. 18-21 respectively show graphs of longitudinal spherical aberration, field sags, distortion and lateral color aberration of Numerical Embodiment 4 of the present invention.
Figure 19:
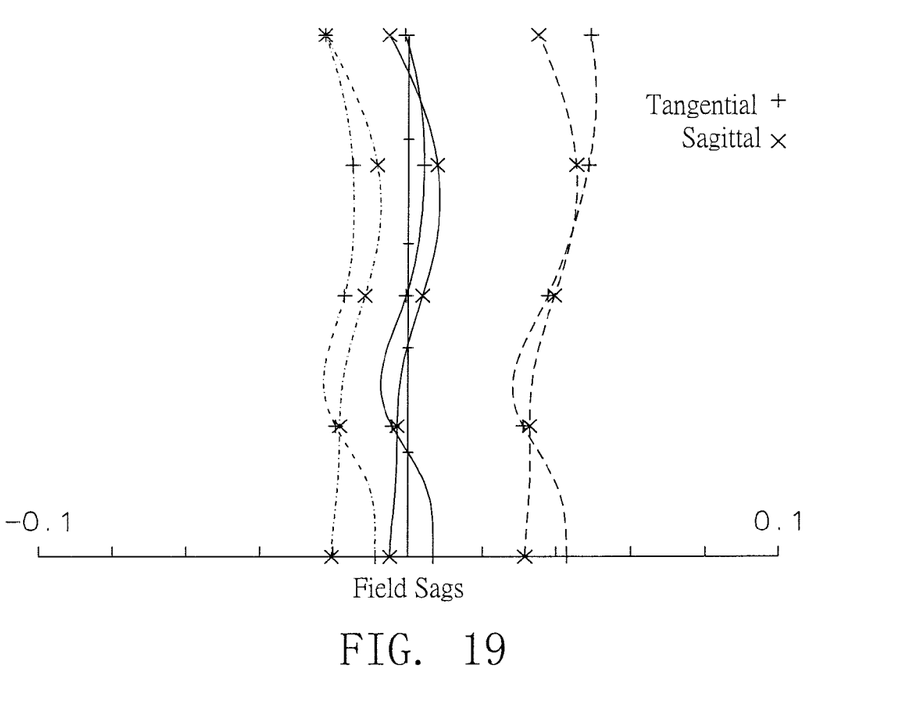
Figure 20:
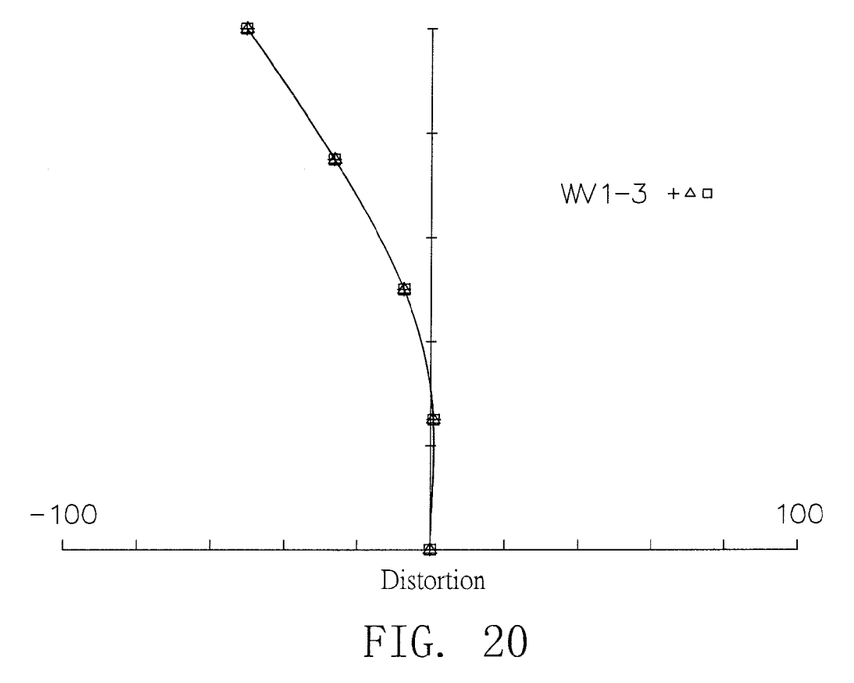
Figure 21:
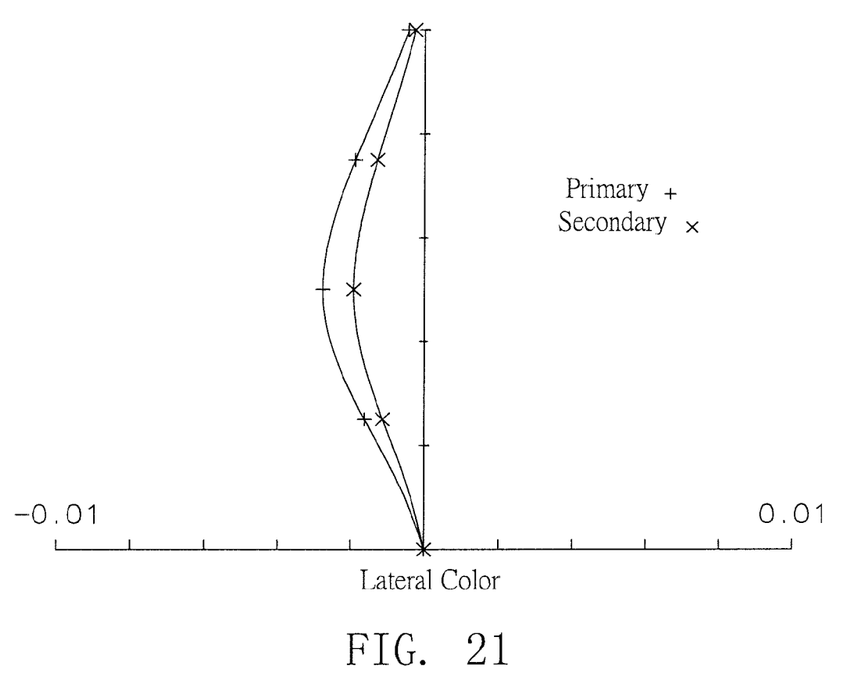

As shown in FIG. 17, a compact imaging lens system in accordance with Numerical Embodiment 4 of the present invention includes a first lens 14 of negative refractive power, a free-form surface prism 24 of positive refractive power, an aperture stop 54, a second lens 34 of positive refractive power, a glass cover 64 and an image plane 44. The first lens 14 is a biconcave lens. The free-form surface prism 24 has a convex incidence surface S34, a curved (convex) reflecting surface S44 and a convex exit surface S54. The second lens 34 is a biconvex lens. The numerical data of Numerical Embodiment 4 will be shown below.

| Surface (i) | Ri (mm) | D/T (mm) | Nd | Vd |
|---|---|---|---|---|
| S0 | ∞ | ∞ | | |
| S14 | −3.832 | 1.1 | 1.5136 | 57.4 |
| S24 | 1.90 | 1.70 | | |
| S34 | 3.884 | 2.531 | 1.5136 | 57.4 |
| S44 | −1434.006 | −2.531 | 1.5136 | 57.4 |
| S54 | 2.794 | −1.5 | | |
| S64 | ∞ | −0.1 | | |
| S74 | −2.403 | −0.7 | 1.51633 | 64.1 |
| S84 | 12.981 | −1.684 | | |
| S94 | ∞ | −0.8 | 1.51633 | 64.1 |
| S104 | ∞ | | | |

In the above table, as the coordinate rotates 90 degrees at the reflecting surface S44 of the prism 24, negative distances are shown.

In this numerical embodiment, both the first lens 14 and the prism 24 are made aspheric. The aspheric surfaces thereof are expressed by the following equation:

$$z = \frac{ch^2}{1+[1-(k+1)c^2h^2]^{\frac{1}{2}}} + Ah^4 + Bh^6 + Ch^8 + Dh^{10}$$

And, again, the variables of the equation, including z, c, h, k, and A, B, C, and D, are all defined previously.

Specifically, the two surfaces S14, S24 of the first lens 14, and the incidence surface S34 and the exit surface S54 of the prism 24 are all made aspheric. Aspheric coefficients for these aspheric surfaces are illustrated below:

| | Coef. | | | |
|---|---|---|---|---|
| Surface (i) | A | B | C | D |
| S14 | −29.250097 | 0 | 0 | 0 |
| S24 | 0 | −0.01235 | 0.001129 | 0 |
| S34 | −19.578296 | 0 | 0 | 0 |
| S54 | −1.070518 | 0 | 0 | 0 |

In this numerical embodiment, the respective values of the above conditions (1), (2) and (3), and the effective focal length, the field of view, the total length and the F-number of the present lens system are listed in the table as below.

| | |
|---|---|
| Effective Focal Length of Lens System (f) | 1.3 mm |
| Field of View (F.O.V) | 120 degrees |
| Total Length of Lens System | 12.64 m |
| F-number | 2.82 |
| \|f1/f\| | 1.7 |
| f2/f | 3.2 |
| f3/f | 3.07 |

As illustrated in the above table, the respective values of |f1/f|, f2/f and f3/f are 1.7, 3.2 and 3.07, all of which are within a corresponding range specified by condition (1), (2) or (3).

FIGS. 18-21 respectively show graphs of longitudinal spherical aberration, field sags, distortion and lateral color aberration of Numerical Embodiment 4 of the present compact imaging lens system. From these graphs, it can be seen that the present compact imaging lens system of Numerical Embodiment 4 provides a high level of optical performance.

As described above, the present compact imaging lens system is only composed of two lenses and a prism, and thus has the advantages of simple structure, easy assembly, wide angle of view, small size and light weight. By application of a free-form surface prism, the optical axis of the present lens system is rotated by 90 degrees to fold the optical path, whereby the total length and the volume of the present lens system can be reduced. At the same time, various aberrations also can be compensated to obtain high image resolution. Further, by replacing conventional glass lens elements with injection molded plastic lens elements having aspheric surfaces, the production cost of the present lens system is significantly reduced, the optical length of the present lens system is shortened and the production yield is also increased.

It should be noted that the present compact imaging lens system is a wide-angle lens system having an angle of view larger than 120 degrees. Therefore, the present lens system is more suitable for use in vehicles, monitoring systems and network video systems, although it also may be used as a common wide-angle image capture lens. The overall optical length of the present lens system is only about 7.5 mm, which facilitates the application of the present lens system into vehicles, anti-thief systems, computer peripheral systems and even mobile phones. The construction of the present lens system not only shortens the total length of the present lens system, saves production cost, reduces tolerance, but assures a high level of optical performance as well.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A compact imaging lens system comprising, in order from the object side to the image side, a first lens of negative refractive power, a free-form surface prism of positive refractive power and a second lens of positive refractive power, the free-form surface prism having an incidence surface, a reflection surface and an exit surface, the first lens being disposed on the side of the incidence surface of the free-form surface prism, the second lens being disposed on the side of the exit surface of the free-form surface prism, the free-form surface prism satisfying the following conditions:

$$2.5 < f2/f < 5.0$$

where, f2 represents the effective focal length of the prism.

2. The compact imaging lens system as claimed in claim 1, satisfying the condition of $1.3 < |f1/f| < 2.3$, wherein f represents the effective focal length of the compact imaging lens system, and f1 represents the effective focal length of the first lens.

3. The compact imaging lens system as claimed in claim 2, satisfying the condition of $2.5 < f3/f < 4.0$, wherein f3 represents the effective focal length of the second lens.

4. The compact imaging lens system as claimed in claim 1, further comprising an aperture stop disposed between the prism and the second lens.

5. The compact imaging lens system as claimed in claim 1, further comprising a glass cover disposed between the second lens and the image side.

6. The compact imaging lens system as claimed in claim 1, wherein the first lens has at least one aspheric surface.

7. The compact imaging lens system as claimed in claim 6, wherein the reflection surface of the prism is inclinedly positioned on an optical axis of the compact imaging lens system, the incidence surface of the prism is positioned on the object side, and the exit surface of the prism is positioned on the image side.

8. The compact imaging lens system as claimed in claim 7, wherein both the incidence surface and the exit surface of the prism are aspheric surfaces.

9. The compact imaging lens system as claimed in claim 8, wherein both the incidence surface and the exit surface of the prism are convex surfaces, and the reflection surface of the prism is a planar surface or a convex surface.

10. The compact imaging lens system as claimed in claim 8, wherein the second lens is an aspheric lens.

11. The compact imaging lens system as claimed in claim 1, wherein the first lens, the prism and the second lens are all made of plastics.

12. The compact imaging lens system as claimed in claim 1, wherein both the first lens and the prism are made of plastics, and the second lens is made of glass.

13. A compact imaging lens system comprising, in order from the object side to the image side, a first lens of negative refractive power, a free-form surface prism of positive refractive power and a second lens of positive refractive power, the first lens, the free-form surface prism and the second lens satisfying the following conditions:

$$1.3 < |f1/f| < 2.3;$$

$$2.5 < f2/f < 5.0;$$

$$2.5 < f3/f < 4.0,$$

where f represents the effective focal length of the compact imaging lens system, and f1, f2 and f3 represent the effective focal lengths of the first lens, the free-form surface prism and the second lens, respectively.

14. The compact imaging lens system as claimed in claim 13, wherein the free-form surface prism has an incidence surface, a reflection surface and an exit surface, the first lens is disposed on the side of the incidence surface, and the second lens is disposed on the side of the exit surface.

15. The compact imaging lens system as claimed in claim 13, wherein the free-form surface prism has an incidence surface facing the first lens, a reflection surface inclinedly positioned on an optical axis of the compact imaging lens system, and an exit surface positioned toward the image side.

16. The compact imaging lens system as claimed in claim 13, wherein both the first lens and the free-form surface prism are made aspheric.

17. The compact imaging lens system as claimed in claim 13, further comprising an aperture stop disposed between the free-form surface prism and the second lens, and a glass cover disposed between the second lens and the image side.

* * * * *